United States Patent Office 3,439,946
Patented Apr. 22, 1969

3,439,946
STEEL PIPE TRACK ROD FOR MOTOR VEHICLES
Rudolf Gottschald, Osterath, and Gottfried Maxeiner, Dusseldorf, Germany, assignors to A. Ehrenreich & Cie, Dusseldorf-Oberkassel, Germany
Filed Mar. 23, 1966, Ser. No. 536,896
Claims priority, application Germany, Mar. 31, 1965, E 29,011
Int. Cl. F16b 7/00; B25g 3/38
U.S. Cl. 287—90      1 Claim

ABSTRACT OF THE DISCLOSURE

A ball joint-tie rod connection in which the tie rod in the form of an inwardly threaded pipe threadedly receiving the threaded stud of the ball joint has an abutment ring firmly mounted on that end portion of the tie rod which is adjacent said ball joint, while that end face of said ring which faces said ball joint is enlarged over the other end face of said ring and is engaged by a lock nut.

---

The present invention relates to a steel pipe track or tie rod with ball joints for motor vehicles. It is known to provide the end of the track rod with an inner thread in order to be able to screw thereinto the stud of the ball joint. For safety reasons, a lock nut is screwed onto the stud of the ball joint which lock nut when being tied rests against the end face of the steel pipe. This end face, however, is rather narrow with heretofore customary track rods because on one hand a portion of the end face is cut away by the thread, while on the other hand the circular outer edge of said end face is deburred whereby the end face is likewise reduced. In view of this narrow end face, frequently the necessary safe connection between the pipe and the ball joint cannot be realized by the lock nut.

It is, therefore, an object of the present invention to provide a connection between the track or tie rod and the stud of the ball joint, which will overcome the above mentioned drawbacks.

It is another object of this invention to provide a connection as set forth in the preceding paragraph, which will be simple and reliable.

These and other objects and advantages of the invention will appear more clearly from the following specification in connection with the accompanying drawing, in which.

The ball joint track rod connection according to the present invention is characterized primarily in that the end portion of the track rod is provided with an inner thread for threadedly receiving the threaded stud of the ball joint, while that end of said threaded end portion of the track rod which faces the ball joint has an outer diameter considerably greater than the normal pipe diameter of said tubular track rod. More specifically, the said pipe end which faces the ball joint may be thickened, or an abutment ring may be mounted on the end of the pipe to thereby bring about the enlargement of the respective end face. According to a practical embodiment of the invention, the said pipe end may be knurled and may have slipped thereon an abutment ring so that the said ring will be firmly held on the pipe end without requiring additional connecting means.

Figure 1:
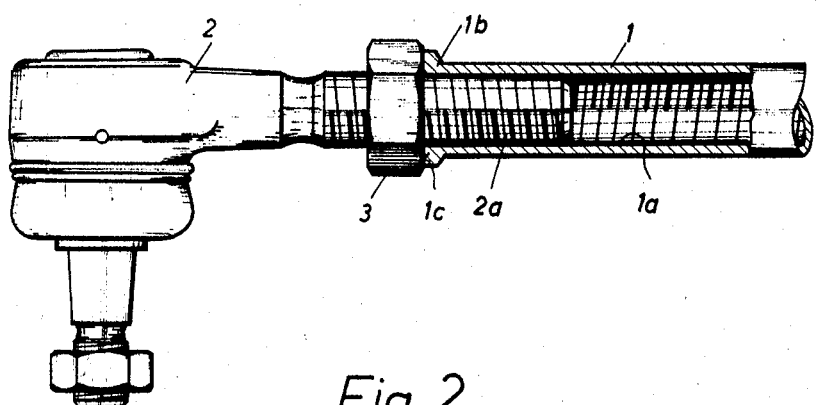
FIG. 1 illustrates partly in view and partly in section a connection of the track rod with a ball joint.

Referring now to the drawing in detail, FIG. 1 illustrates a portion of the track rod 1 which is formed of a steel pipe provided with an inner thread 1a. This thread 1a is threadedly engaged by a threaded stud 2a of a ball joint 2. For purposes of securely holding stud 2a of the ball joint in the tubular section 1 of the track rod, the pipe end is provided with a thickened portion 1b whereby an enlarged end face 1c is formed for tubular section 1 against which end face a lock nut 3 is screwed.

Figure 2:
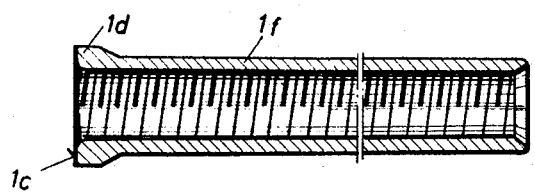
FIG. 2 illustrates in section a modification of the tubular end of the track rod.

FIG. 2 shows a pipe section 1f of a track rod which differs slightly from the pipe section 1 of FIG. 1 inasmuch as said thickened portion 1d is somewhat longer and merges more gradually with the remainder of the pipe section 1f. The said thickened portions 1b and 1d may be obtained in various ways, for instance by an upsetting operation.

Figure 3:
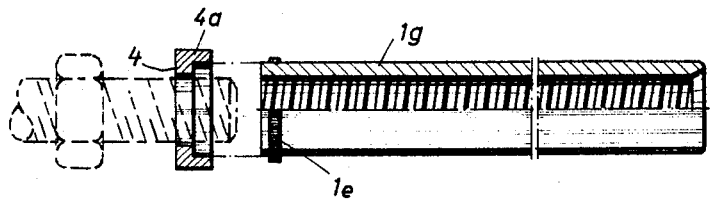
FIG. 3 represents still another modification of the present invention according to which the tubular end of the track rod is provided with an abutment ring.

Instead of providing the pipe section with a thickened portion, it is also possible to provide the pipe section with an abutment ring. Such a connection is shown in FIG. 3 in which the pipe section 1g has that end thereof which will be adjacent to the ball joint provided with a knurled portion 1e. Slipped over or pressed onto knurled portion 1e is an abutment ring 4 having a collar 4a. In view of the knurled surface of section 1e, a firm connection will be established between abutment ring 4 and the knurled section 1e when the abutment ring is pressed thereonto. The outer diameter of abutment ring 4 may be selected in conformity with the desired end face for pipe section 1g. It will be appreciated that when pipe section 1g is to be connected to the ball joint after the abutment ring 4 has been firmly seated on the knurled section 1e, the lock nut 3 will rest against the left-hand end face (with regard to FIG. 3) of the abutment ring 4.

It is, of course, to be understood that the present invention is, by no means, limited to the particular embodiments shown in the drawing.

What we claim is:

1. In an automobile steering mechanism: a ball joint having a threaded stud, a tie rod formed by a pipe having its inner peripheral surface provided with a thread threadedly receiving a portion of said threaded stud, an abutment ring mounted on that end of said tie rod which is adjacent to said ball joint, said abutment ring having a first annular section extending around the adjacent peripheral portion of said tie rod and also having a second section in the form of a radially inwardly extending flange in abutment with the adjacent end face of said tie rod, the inner diameter of said flange slightly exceeding the outer diameter of said stud, and a locking nut threadedly engaging said stud and having that end face of said nut which faces said abutment ring in firm abutting engagement therewith so as to firmly connect both said stud and said abutment ring to said tie rod.

References Cited

UNITED STATES PATENTS

| 787,462 | 4/1905 | Myers. | |
|---|---|---|---|
| 1,445,830 | 2/1923 | Gifford. | |
| 2,551,437 | 5/1951 | Jeffus | 287—88 |
| 1,714,708 | 5/1929 | Winning | 29—525 |
| 2,098,892 | 11/1937 | Sintz | 29—525 |
| 2,636,254 | 4/1953 | Gunning | 29—525 |
| 3,239,930 | 3/1966 | Violleau | 287—60 |

FOREIGN PATENTS

| 740,215 | 2/1944 | Germany. |
|---|---|---|
| 600,681 | 12/1959 | Italy. |

EDWARD C. ALLEN, *Primary Examiner.*
ANDREW V. KUNDRAT, *Assistant Examiner.*

U.S. Cl. X.R.
74—586; 287—125